United States Patent Office 3,519,076
Patented July 7, 1970

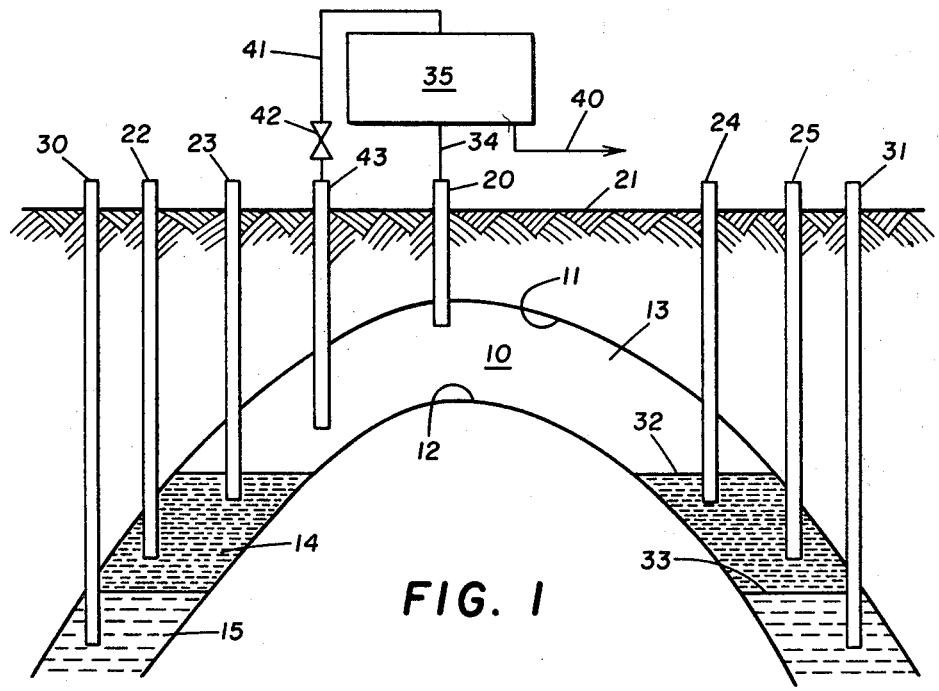
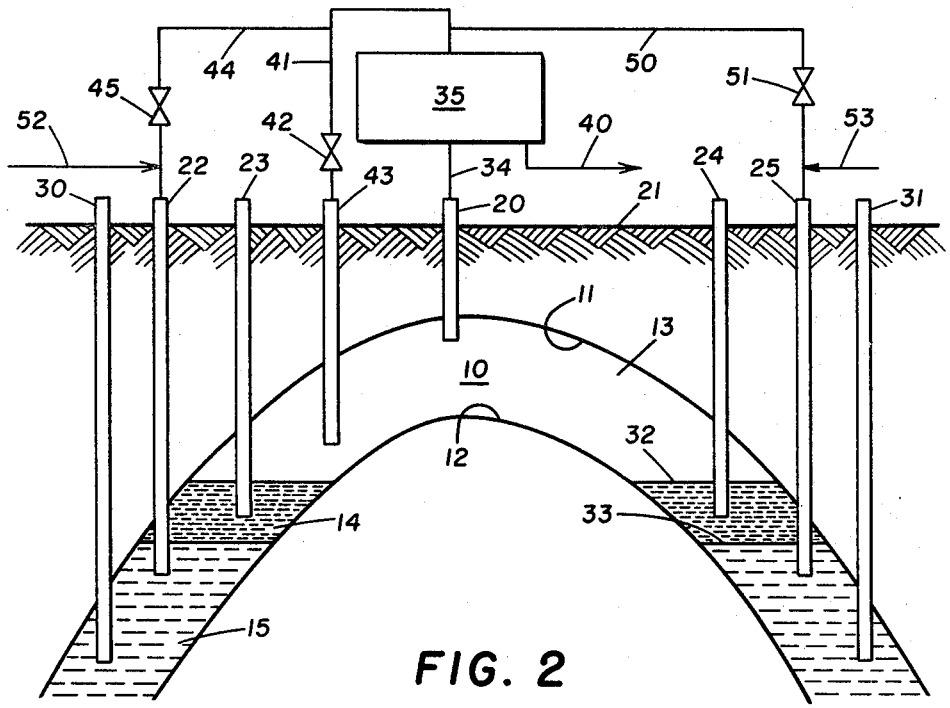

3,519,076
GAS INJECTION METHOD FOR
RECOVERING OIL
Donald Walker, New Orleans, La., assignor to Mobil Oil Corporation, a corporation of New York
Filed Oct. 17, 1968, Ser. No. 768,464
Int. Cl. E21b 43/20
U.S. Cl. 166—263     6 Claims

ABSTRACT OF THE DISCLOSURE

This specification discloses a method for recovering oil from a subterranean formation containing a gas zone, an oil zone, and a water zone. Water is injected into the water zone and oil is recovered from a well leading from the oil zone. As the water zone moves upwardly with continued injection of water, and, as a result, water appears in excessive amounts in the fluid produced from a well leading from the oil zone, this well is converted to a gas injection well and gas is injected into the formation through this well. Water injection is continued during gas injection and oil is produced from a well leading from the oil zone located upstructure from the gas injection well. The gas injected into the gas injection well may be obtained from the gas zone contained in the formation.

BACKGROUND OF THE INVENTION

Field of the invention

This invention relates to the recovery of oil from a subterranean formation.

Oil-containing subterranean formations can contain a gas zone, an oil zone, and a water zone. The gas zone, since the gas has a lesser density than the oil or water, will be in the upper portion of the formation. The oil zone, since the oil has a lesser density than the water, will be in the portion of the formation below the gas zone, and the water zone will be in the portion of the formation below the oil zone. This invention is concerned with means for increasing the recovery of oil from such a formation.

Description of the prior art

The oil contained in the oil zone can be recovered by being produced to the surface of the earth from a well leading from the oil zone. For this purpose, the natural energy within the formation may be employed. Thus, by virtue of the pressure of the fluids in the formation, and the compressibility of these fluids, such as the pressure of the gas in the gas zone, the oil can be forced from the oil zone upwardly through a well leading from the oil zone. Further, by virtue of natural water drive, the water zone tends to move upwardly within the formation and thus forces the oil from the oil zone upwardly through the well. Additionally, by virtue of gas dissolved in the oil in the oil zone, a pressure is imparted to the oil in the oil zone to force the oil from the oil zone upwardly through the well. These mechanisms may operate singly, or any two, or all three, may operate simultaneously to effect recovery of oil.

With continued recovery of oil, the natural energy within the subterranean formation will become depleted. Upon depletion of the natural energy, considerable oil will still remain within the formation, however, and extrinsic energy can be applied to the formation to recover as much as possible of the remaining oil. Where the formation originally is devoid of natural energy, or the natural energy is insufficient to effect recovery of oil at a satisfactory rate, extrinsic energy can be applied to the formation for recovery of the oil.

Application of extrinsic energy has commonly been through the injection of water or gas, or both, into the subterranean formation. Thus, in U.S. Pat. No. 2,842,204, there is disclosed the recovery of oil from a formation having a gas zone, an oil zone, and a water zone by injecting water into the gas zone and producing oil from a well leading from the oil zone to the surface of the earth. Further, in U.S. Pat. No. 3,244,228, there is disclosed the recovery of oil from a watered-out reservoir by alternate injection of gas and water into the watered-out portion of the formation. In U.S. Pat. No. 2,828,819, there is disclosed the recovery of oil from a formation having gas, oil, and water zones by injecting water into the water zone and injecting gas into the gas zone so as to tilt the oil zone to position one edge thereof to a point where an oil production well can be located. A particular procedure for applying extrinsic energy to a formation having gas, oil, and water zones is disclosed in U.S. Pat. No. 1,899,497. Wells leading to the surface of the earth are bottomed in each of the zones. To maintain gas pressure on the oil in the oil zone as the oil is being recovered, natural gas is injected into the gas zone by way of the gas wells or injected into the oil zone by way of the oil wells. As oil from the oil zone is produced, its level falls and hence the capacity of the gas zone increases, which is objectionable. To maintain this level substantially constant, water is injected into the water zone by way of the water wells. As the water rises and goes past wells which formerly served as oil production wells, these wells are converted to water injection wells. In U.S. Pat. No. 2,936,030, there is disclosed the recovery of oil from a formation having an oil zone and a water zone. When the water level rises above the bottom of the oil production well, gas is injected through this well to create a gas zone in the formation, the gas being injected through this well simultaneously with production of liquids from this well. Creation of the gas zone forces the oil remaining in the formation below the bottom of this well so that oil production from this well can be continued.

SUMMARY OF THE INVENTION

The invention involves the recovery of oil from a subterranean formation containing a gas zone, an oil zone, and a water zone with oil being produced from at least one production well in the oil zone as a result of water being injected into the water zone. The water zone rises with continued injection of water and production of oil, and eventually reaches the production well whereby an excessively high ratio of water to oil is produced from this well. This well is then converted to a gas injection well, gas is injected through this well, and oil is produced from a production well located upstructure in the oil zone from this well.

BRIEF DESCRIPTION OF THE DRAWINGS

FIG. 1 is a vertical sectional view schematically illustrating a subterranean formation having gas, oil, and water zones and wells located in these zones.

FIG. 2 is a vertical sectional view schematically illustrating an embodiment of the invention as applied to the subterranean formation of FIG. 1.

DESCRIPTION OF THE PREFERRED EMBODIMENTS

Referring to FIG. 1, subterranean formation 10 is located between upper impervious earth layer 11 and lower impervious earth layer 12. Located within the formation are gas zone 13, oil zone 14, and water zone 15. Well 20 leads from the gas zone 13 to the surface of the earth 21. While one well leading from the gas zone is shown, it will be understood that a plurality of wells may lead from the gas zone. Wells 22, 23, 24, and 25 lead from the oil zone to the surface of the earth. While four wells leading from the oil zone are shown, it will be understood that less or more than four wells may lead from the oil zone. Wells 30 and 31 lead from the water zone to the surface of the earth and while two wells are shown it will be understood that less or more than two wells may lead from the water zone to the surface of the earth. Interface 32 separates the gas zone from the oil zone and interface 33 separate the oil zone from the water zone. The interfaces 32 and 33, as well known in the art, are not sharp dividing lines but are merely lines on one side of which there is a higher ratio of one fluid to the other than on the other side of the line.

The formation 10, as shown, is in idealized form and is in the form of a dome structure. It will be understood, however, that the formation may be in a form other than a dome structure. The gas zone is located at the apex of the structure and the gas zone is variously described as a gas dome or a gas cap. The oil zone is located below the gas zone and this location is described as being downstructure from the gas zone. Conversely, the gas zone is described as being upstructure from the oil zone. The water zone is located below the oil zone and this location is described as being downstructure from the oil zone. Conversely, the oil zone is described as being upstructure from the water zone.

Wells 22 and 25 leading from the oil zone 14 are bottomed in the oil zone at the lower portion thereof. Wells 23 and 24 are also bottomed in the oil zone 14 but at a point higher in the oil zone than wells 22 and 25. The wells 22 and 25 are downstructure from wells 23 and 24 and wells 23 and 24 are upstructure from wells 22 and 25.

Oil is produced from wells 22, 23, 24, and 25. At the beginning of oil production from formation 10, the natural energy within the formation can effect the production of the oil. Thus, the pressure of fluids such as the pressure of the gas in the gas zone 13, the pressure of gas dissolved in the oil in the oil zone 14, and the pressure of the natural water drive, either singly, or in combinations of two, or in a combination of all three, will force the oil out of the oil zone upwardly through the wells 22, 23, 24, and 25.

Upon depletion of the natural energy in the formation, or where the formation is originally devoid of natural energy, water injection is carried out to effect recovery of the oil in the oil zone. In the formation illustrated in FIG. 1, water is injected into the formation through wells 30 and 31 bottomed in the water zone. With injection of water, the pressure of the water in the water zone 15 is increased and this pressure is imposed on the oil in the oil zone 14. As a result, the oil in the oil zone is placed under pressure forcing it upwardly through the wells 22, 23, 24, and 25.

The pressure of the gas in the gas zone 13 is preferably maintained relatively constant. This is for the reason that any appreciable reduction in the pressure will permit movement of the interface 32 between the gas zone and oil zone and the interface 33 between the oil zone and the water zone upwardly in the formation 10. As a result, the interface 33 may move upwardly beyond the bottom of wells 22 and 25, thereby deleteriously affecting production of oil from these wells. The interface 33 may also move upwardly beyond the bottom of wells 23 and 24, thereby deleteriously affecting production of oil from all of the oil wells in the oil zone. In this case, if possible, the wells may be recompleted at a point above their bottoms. However, if the interface 33 has moved sufficiently far upwardly, new wells must be drilled upstructure in the formation so that they will be bottomed in the oil zone or gas must be injected into the gas zone to increase the pressure therein and move the oil zone downwardly to a position where oil may be produced from the existing oil wells.

While it is preferred to maintain the pressure of the gas in the gas zone 13 relatively constant, slight reductions in pressure are not of serious consequence. Thus, where the gas in the gas zone contains hydrocarbon components heavier than methane, such as ethane, propane, or butane, the gas may be removed from the gas zone for the removal of these components and the remainder of the gas, i.e., the methane, recycled to the gas zone. These heavier components comprise only a small proportion of the gas, the methane constituting the overwhelmingly large proportion of the gas. Such procedure results in the economic advantage that the heavier components of the gas are recovered and the slight reduction in pressure in the gas zone occasioned by the removal of these components is inconsequential from the standpoint of the upward movement of the oil zone in the formation. Thus, as shown in FIG. 1, gas is withdrawn from the gas zone 13 through well 20 and passed through line 34 to separation facilities 35. In separation facilities 35, the heavier components are separated from the methane by any suitable procedure such as absorption in an absorption oil, adsorption on a solid adsorbent, or condensation by cooling, or by any combination of these procedures. The heavier components separted from the methane are removed from the separation facilities through line 40 for sale or otherwise. The methane is removed from the separation facilities through line 41, provided with valve 42, and return to the gas zone through well 43.

With continued injection of water into the water zone 15 and production of oil from the oil zone 14, the interface 33 between the water zone and the oil zone rises. However, the interface 32 between the gas zone 13 and the oil zone 14 will remain substantialy constant where no gas is removed from the gas zone or, where gas is removed for separation of the heavier components, the methane is recycled to the gas zone. The interface 33 rising within the formation will eventually rise above the bottom of wells 22 and 25. As mentioned previously, the interface 33 is not a sharp dividing line. Thus, as the interface reaches the bottom of the wells 22 and 25, oil is still produced from these wells but the proportion of oil in the fluid produced from the wells continually becomes less. Eventually, the proportion of oil in the fluid produced from these wells becomes so low that production from these wells becomes uneconomical. On the other hand, as is well known, a considerable proportion of oil still remains in the portion of the formation previously occupied by the oil zone and through which the interface 33 has passed, i.e., the watered-out zone. By the process of this invention, recovery of at least a portion of this oil is effected.

In FIG. 2, the interface 33 is shown as having risen above the bottom of wells 22 and 25 and, if wells 22 and 25 were to continue to be produced, the fluid produced therefrom would contain so little oil that continued production would no longer be economical. As shown, the interface 33 is above the bottom of wells 22 and 25. At this point, at least one of wells 22 and 25 is converted to a gas injection well and gas is injected through this well into the watered-out zone. Thus, for example, well 22 can be converted to a gas injection well and gas injected through this well into the formation. Water injection is continued through wells 30 and 31 and oil is produced from wells 23 and 24 upstructure from well 22. Upon conversion of an oil production well to a gas injection well, production of fluids from the formation 10 through this well is no longer carried out. The well is employed exclusively as a gas injection well. In the situation where the formation 10 is not provided with an oil production well located upstructure from the production well at the time the interface between the water zone and the oil zone passes the bottom of the production well, such a well may be drilled and completed at that time. Each production well, laterally positioned within the formation with respect to each other, upon the interface between the water zone and the oil zone rising above the bottom thereof, whereby the fluid produced from the well contains so little oil that the well can no longer be economically produced, is converted to a gas injection well. Gas is injected through this well into the formation, water injection to the formation is continued, and oil is produced from a well upstructure from the well through which gas is injected. Thus, well 25 can also be converted to a gas injection well and gas injected through this well into the formation.

Whereas the interface between the water zone and the oil zone will rise above the bottom of a production well and the fluid produced from the well will contain but little oil, the watered-out zone, i.e., the portion of the oil zone through which the interface has passed, from its original position at the time production of oil from the oil zone is initiated, still contains oil, as previously mentioned. With injection of water into an oil-containing formation, the proportion of oil removed therefrom by reason of the injection of the water will not exceed an irreducible minimum. The irreducible minimum can be defined in physical terms or economic terms. In physical terms, the irreducible minimum is the amount of oil remaining in the formation when the water will no longer remove any oil. In economic terms, the irreducible minimum is the amount of oil remaining in the formation when the proportion of oil in the fluid produced from the formation is so low that the cost of producing the fluid and separating the oil from the water is greater than the value of the oil. However, the irreducible minimum of oil in the formation, regardless of the terms of definition, will be that attained by the particular method employed for removing the oil from the formation, i.e., the injection of water in this case. With conversion of an oil production well to a gas injection well and injection of gas through this well into the formation through which the interface between the oil zone and the water zone has passed, a new, and lower, irreducible minimum is attained and, accordingly, a further amount of oil can be recovered from the formation.

The gas injected into the formation displaces oil still contained in the formation through which the interface between the oil zone and the water zone has passed and moves the oil upstructure to a production well located upstructure from the well through which the gas is injected. This oil can then be produced from this production well. With injection of gas into well 22, the gas moves upstructure. The gas will move upstructure by reason of having a lesser density than the water and the oil. Further, with the well 23 being a producing well, the pressure gradient within the formation will be between the well 22 and the well 23 tending to move the gas upstructure. For this reason also, the gas will not tend to migrate laterally through the formation. Since the gas will not normally move laterally, unless there is a pressure reduction in that direction, each production well past which the interface between the water zone and the oil zone has passed, as previously mentioned, is preferably converted to a gas injection well and gas injected into the well.

The gas injected into the formation through the well converted from an oil production well may be any suitable gas. Thus, the gas may be natural gas, enriched gas, air, exhaust gas, or other gas. Further, the gas may be obtained from any suitable source. This source may be an outside source. It is preferred, however, that the gas injected be gas that has its origin in the gas zone 13. A portion of the gas injected into the formation is able eventually to migrate upwardly to the gas zone. Where the injected gas has its origin in the gas zone, the gas migrating upwardly to the gas zone replaces, at least partially, that removed from the gas zone and the interface 32 does not rise appreciably.

Where the gas injected into the formation through a gas injection well converted from an oil production well has its origin in the gas zone, the gas leaving production facilities 35 through line 41 may be passed to well 22 through line 44 provided with valve 45 and to well 25 through line 50 provided with valve 51. In this case, valves 45 and 51 will be open and valve 42 will be closed.

Where the gas injected into the formation through a gas injection well converted from an oil production well is from an outside source, the gas may be passed to well 22 through line 52 connected to line 44 and to well 25 through line 53 connected to line 50. In this case, valves 45 and 51 will be closed. With gas being obtained from an outside source, the methane from production facilities 35 may be recycled through line 41, valve 42 being opened, and well 43 to the gas zone. If the interface 32 tends to move downwardly because of this procedure, and the level of the interface is desirably held constant, a part of the methane from the production facilities may be discarded.

While the gas passed into the formation through a gas injection well converted from an oil production well may have its origin in the gas zone, or be from an outside source, it will be understood that both gas having an origin in the gas zone and gas from an outside source may be employed.

The following example will be further illustrative of the invention.

An oil formation in Louisiana, at a depth of about 8900 feet, had a water zone, an oil zone, and a sizable gas zone. Oil was produced from this formation for a period of about five years, with the gas zone, or cap, shut-in, employing the natural energy of the formation. Water was injected into the water zone along the flanks of the oil zone through water injection wells, most of these being bottomed below the interface between the oil zone and the water zone and one of these being bottomed at this interface. This water injected effected a periphery type waterflood, and oil was produced from wells leading from the oil zone. Operations were continued along this line for a period of three years, at the end of which time removal of gas from the gas zone was commenced. This gas removed from the gas zone was passed to production facilities for the separation of the heavier hydrocarbons from the remainder of the gas and the remainder of the gas was recycled to the gas zone. Meanwhile, producing wells located downstructure began watering out, i.e., the proportion of water in the fluid produced from the wells began to become excessively high and the wells began approaching their economic limit. After operating this way for a period of about six years, an oil production well at the periphery of the oil zone which had reached its economic limit was converted to a gas injection well and the gas previously recycled to the gas cap was injected into the formation through this well. Shortly thereafter, the rate of oil production from wells upstructure of the gas injection well increased significantly.

I claim:

1. In the recovery of oil from a subterranean formation containing a gas zone, an oil zone, and a water zone by a procedure where water is injected into said water zone and oil is produced from said oil zone through a production well in said oil zone, and, as a result of said water injection and production of said oil, said water zone rises in said formation and eventually reaches said production well whereby an excessively high ratio of water to oil is produced from said production well, the improvement comprising converting said production well to a gas injection well, injecting gas into said formation through said gas injection well, continuing to inject water into said water zone, and producing oil from at least one production well located upstructure in said oil zone from said gas injection well.

2. The process of claim 1 wherein said gas injected through said gas injection well is methane.

3. The process of claim 1 wherein said gas injected through said gas injection well is enriched gas.

4. The process of claim 1 wherein said gas injected through said gas injection well has an origin in said gas zone.

5. The process of claim 4 wherein said gas injected through said gas injection well is methane.

6. The process of claim 1 wherein oil is produced from a plurality of production wells and after one of said production wells is converted to a gas injection well when said interface between said water zone and said oil zone reaches said well and gas is injected through said gas injection well, converting other of said production wells to gas injection wells when said interface between said water zone and said oil zone reaches said other of said production wells and injecting gas through said gas injection wells.

References Cited

UNITED STATES PATENTS

| | | | |
|---|---|---|---|
| 1,899,497 | 2/1933 | Doherty | 166—268 |
| 2,828,819 | 4/1958 | Hughes | 166—245 |
| 2,842,204 | 7/1958 | Horner | 166—268 |
| 2,936,030 | 5/1960 | Allen | 166—306 |
| 3,215,198 | 11/1965 | Willman | 166—268 X |
| 3,244,228 | 4/1966 | Parrish | 166—273 |
| 3,288,212 | 11/1966 | O'Brien et al. | 166—245 |
| 3,319,712 | 5/1967 | O'Brien | 166—245 |

STEPHEN J. NOVOSAD, Primary Examiner

U.S. Cl. X.R.

166—268